(12) United States Patent
Horiguchi et al.

(10) Patent No.: US 8,989,653 B2
(45) Date of Patent: Mar. 24, 2015

(54) POWER TRANSMITTER, POWER RECEIVER AND POWER TRANSMISSION AND RECEPTION SYSTEM

(71) Applicant: Kabushiki Kaisha Toshiba, Minato-Ku, Tokyo (JP)

(72) Inventors: Tomoya Horiguchi, Tokyo (JP); Toshiki Miyasaka, Saitama (JP); Kiyoshi Toshimitsu, Tokyo (JP); Yoshinari Kumaki, Yokohama (JP); Ichiro Seto, Tokyo (JP); Hirotsugu Kajihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/780,114

(22) Filed: Feb. 28, 2013

(65) Prior Publication Data

US 2013/0324039 A1 Dec. 5, 2013

(30) Foreign Application Priority Data

Jun. 1, 2012 (JP) .................................. 2012-125910

(51) Int. Cl.
*H04B 7/185* (2006.01)
*H04B 5/00* (2006.01)

(52) U.S. Cl.
CPC ............ *H04B 5/0031* (2013.01); *H04B 5/0037* (2013.01); *H04B 5/0075* (2013.01)
USPC ..... 455/13.4; 455/343.5; 455/522; 340/572.2

(58) Field of Classification Search
CPC ..... H04W 4/008; H04W 76/023; H04W 4/02; H04W 8/005; H04W 12/02; H04W 12/04; H04W 12/08; H04W 24/04

USPC .............. 455/13.4, 343.5, 522, 573, 127.1, 455/343.1, 41.2; 340/572.2, 10.1, 10.3
See application file for complete search history.

(56) References Cited

U.S. PATENT DOCUMENTS

| | | | |
|---|---|---|---|
| 7,521,890 B2 * | 4/2009 | Lee et al. ...................... 320/108 |
| 7,679,514 B2 * | 3/2010 | Rofougaran et al. ....... 340/572.2 |
| 8,022,825 B2 * | 9/2011 | Rofougaran et al. ....... 340/572.2 |
| 8,432,285 B2 * | 4/2013 | Rofougaran et al. ....... 340/572.2 |
| 2007/0167135 A1 * | 7/2007 | Fontijn ......................... 455/41.2 |
| 2014/0121557 A1 * | 5/2014 | Gannon et al. ................ 600/549 |

OTHER PUBLICATIONS

Wireless Power Consortium, "System Description Wireless Power Transfer vol. I: Low Power Part 1: Interface Definition Version 1.0.3," Sep. 2011. http://www.wirelesspowerconsortium.com/developers/specification.html p. 51 6 Communications Interface.

* cited by examiner

*Primary Examiner* — Minh D Dao
(74) *Attorney, Agent, or Firm* — Holtz, Holtz, Goodman & Chick PC (57) ABSTRACT

According to one embodiment, a power transmission and reception system includes a power transmitter and a power receiver. The power transmitter includes: a power transmission module configured to wireless-transmit power to the power receiver; and a first wireless communication module configured to perform wireless communication with the power receiver. The power receiver includes: a power reception module configured to receive the power transmitted from the power transmission module; and a second wireless communication module configured to perform wireless communication with the first wireless communication module using the received power. The second wireless communication module is configured to perform wireless communication while the power reception module is receiving the power.

14 Claims, 10 Drawing Sheets

POWER TRANSMITTER, POWER RECEIVER AND POWER TRANSMISSION AND RECEPTION SYSTEM

CROSS REFERENCE TO RELATED APPLICATIONS

This application is based upon and claims the benefit of priority from the prior Japanese Patent Application No. 2012-125910, filed on Jun. 1, 2012, the entire contents of which are incorporated herein by reference.

FIELD

Embodiments described herein relate generally to a power transmitter, a power receiver and a power transmission and reception system

BACKGROUND

In recent years, a communication system is studied in which power is wirelessly supplied from a host to a memory card having no power supply and the memory card performs wireless communication with the host by using the supplied power. In such a system, since both the power supply and the communication are wirelessly performed, there is a problem that the communication tends to be unstable.

DETAILED DESCRIPTION

In general, according to one embodiment, a power transmission and reception system includes a power transmitter and a power receiver. The power transmitter includes: a power transmission module configured to wireless-transmit power to the power receiver; and a first wireless communication module configured to perform wireless communication with the power receiver. The power receiver includes: a power reception module configured to receive the power transmitted from the power transmission module; and a second wireless communication module configured to perform wireless communication with the first wireless communication module using the received power. The second wireless communication module is configured to perform wireless communication while the power reception module is receiving the power.

Embodiments will now be explained with reference to the accompanying drawings.

First Embodiment

Figure 1:
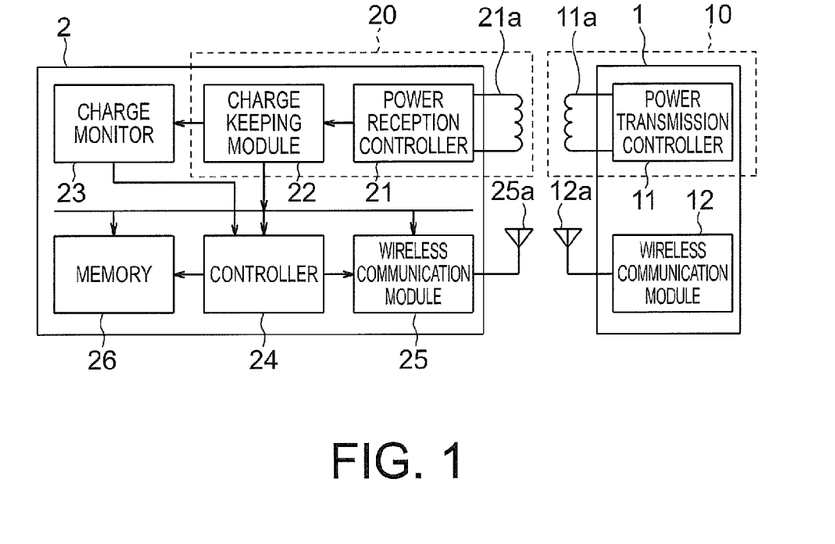
FIG. 1 is a block diagram showing a schematic configuration of a power transmission and reception system according to a first embodiment.

FIG. 1 is a block diagram showing a schematic configuration of a power transmission and reception system according to a first embodiment. The power transmission and reception system includes a power transmitter 1 and a power receiver 2. The power transmitter 1 has a coil 11a and an antenna 12a. The power receiver 2 has a coil 21a and an antenna 25a. The power transmitter 1 is a host, such as a mobile terminal device or a stationary terminal device, and has a relatively large power supply. The power receiver 2 is a so-called tag, such as a memory card which has no power supply or has a relatively small power supply. Therefore, the power receiver 2 operates by using power wirelessly transmitted from the power transmitter 1.

Wireless transmission of power is performed between the power transmitter 1 and the power receiver 2 by using the coils 11a and 21a. The frequency of an electric wave for power transmission is about tens of kHz to tens of MHz. For example, by setting the frequency of the electric wave for power transmission to be 13.56 MHz, the coils 11a and 21a can also be used as a coil for near field communication (NFC).

Wireless communication of data frame including data is performed between the power transmitter 1 and the power receiver 2. The frequency of the electric wave for power transmission is not so high, so that the electric wave for power transmission is not necessarily suited to wireless transmission of a relatively large amount of data frames. Therefore, wireless communication of data frame is performed by using the antennas 12a and 25a. The frequency of an electric wave for wireless communication is high. For example, an ultra wide band (UWB) of 2.4 GHz or 4.48 GHz is used.

As described above, the present embodiment has a configuration in which a power transmission means is different from a wireless communication means. Here, in order to efficiently transmit power, the positioning of the coil 11a and the coil 21a is important. In other words, when the positioning shifts, the amount of transmission power may be largely changed. Therefore, even when the power state is unstable, the power receiver 2 has to perform processing so as not to cause data failure. Therefore, in the present embodiment, the wireless communication is performed while detecting the transmission state of the power.

Hereinafter, a configuration of the power transmitter 1 and the power receiver 2 will be described in detail.

Figure 2:
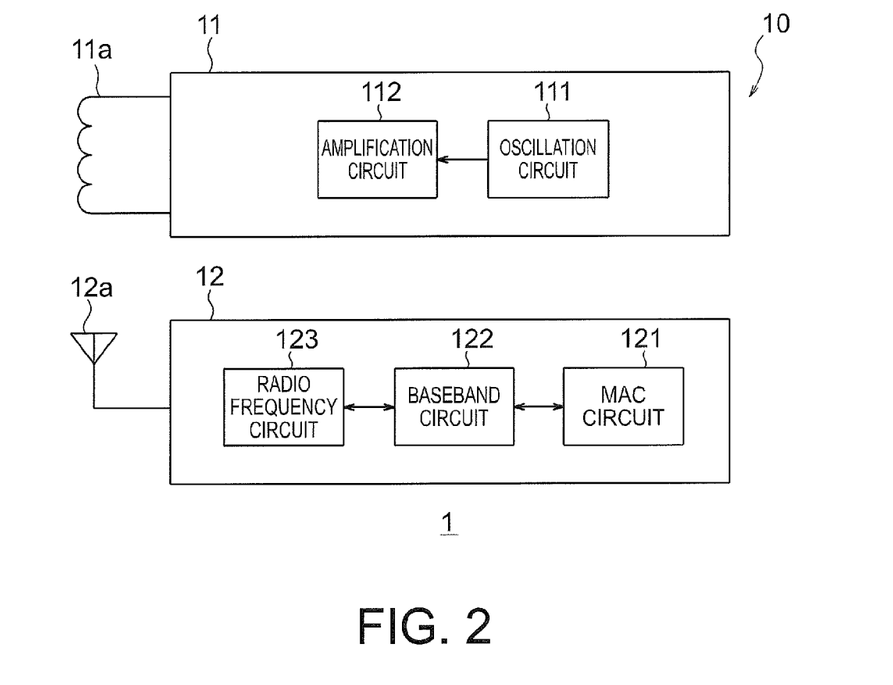
FIG. 2 is a block diagram showing an example of an internal configuration of the power transmitter 1.

FIG. 2 is a block diagram showing an example of an internal configuration of the power transmitter 1. The power transmitter 1 includes a power transmission controller 11, a coil 11a, a wireless communication module (first wireless communication module) 12, and an antenna 12a.

As shown in FIG. 2, the power transmission controller 11 includes an oscillation circuit 111 and an amplification circuit 112. The oscillation circuit 111 generates an oscillation signal for wirelessly transmitting power. The amplification circuit 112 amplifies the oscillation signal. The amplified oscillation signal is applied to the coil 11a, so that an electric wave for power transmission is transmitted. In this way, power is wirelessly transmitted from the power transmitter 1 to the power receiver 2. Note that the power transmission controller 11 and the coil 11a form a power transmission module 10.

The wireless communication module 12 is a circuit for performing high-speed wireless communication and includes a MAC (Media Access Control) circuit 121, a baseband circuit 122, and a radio frequency circuit 123. The MAC circuit 121 performs protocol control on data. The baseband circuit 122 performs signal processing such as error correction, encoding processing, and modulation processing. The radio frequency circuit 123 performs wireless communication of data frame by an ultra wide band wireless electric wave through the antenna 12a. Note that it is also possible to perform wireless communication by electromagnetic coupling using a coupler instead of the antenna 12a.

Figure 3:
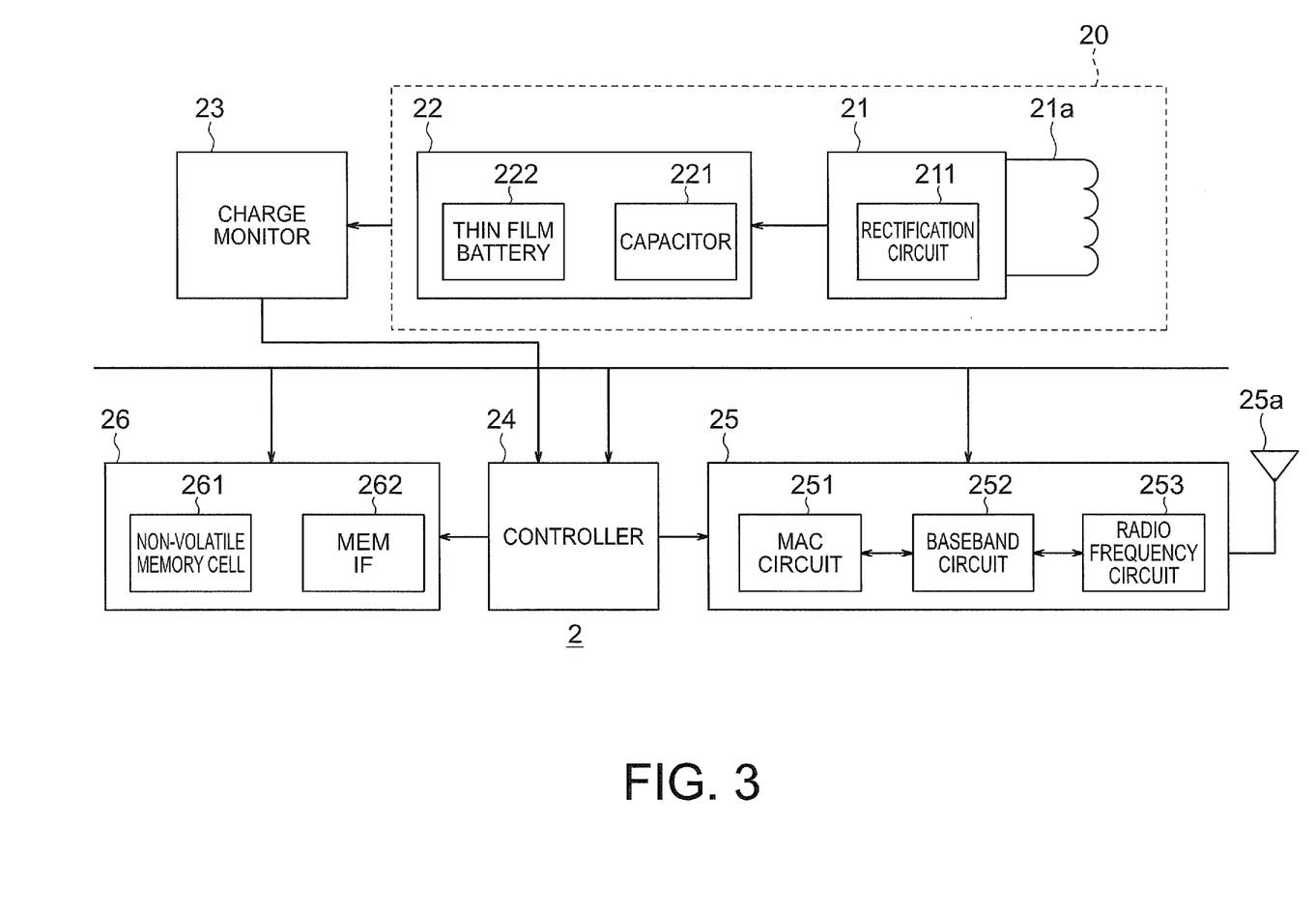
FIG. 3 is a block diagram showing an example of an internal configuration of the power receiver 2.

FIG. 3 is a block diagram showing an example of an internal configuration of the power receiver 2. The power receiver 2 includes a coil 21a, a power reception controller 21, a charge keeping module 22, a charge monitor 23, a controller 24, a wireless communication module (second wireless communication module) 25, an antenna 25a, and a memory 26.

When the coil 21a is disposed at a position near the coil 11a of the power transmitter 1 with a distance of several cm between them, a current corresponding to a current flowing in the coil 11a is generated in the coil 21a. This current flows into the power reception controller 21.

As shown in FIG. 3, the power reception controller 21 has, for example, a rectification circuit 211 including a rectification diode or the like, and converts the current flowing from the coil 21a into a direct current. The charge keeping module 22 has a capacitor 221 for keeping charge. Charge is accumulated in the capacitor 221 by the current converted by the power reception controller 21. The accumulated charge is used for processing operations in each component in the power receiver 2, such as, for example, wireless communication with the power transmitter 1 and access to the memory 26.

FIG. 3 shows an example in which power is converted into magnetic force or the like by the coil 11a and the coil 21a and the power is transmitted with an electromagnetic induction manner and a magnetic resonance manner in mind. Of course, the power transmission may be performed by antennas using a scheme such as an induction electric field manner in which power is transmitted by using electrodes or a power transmission manner using a radiated field.

Figure 4:
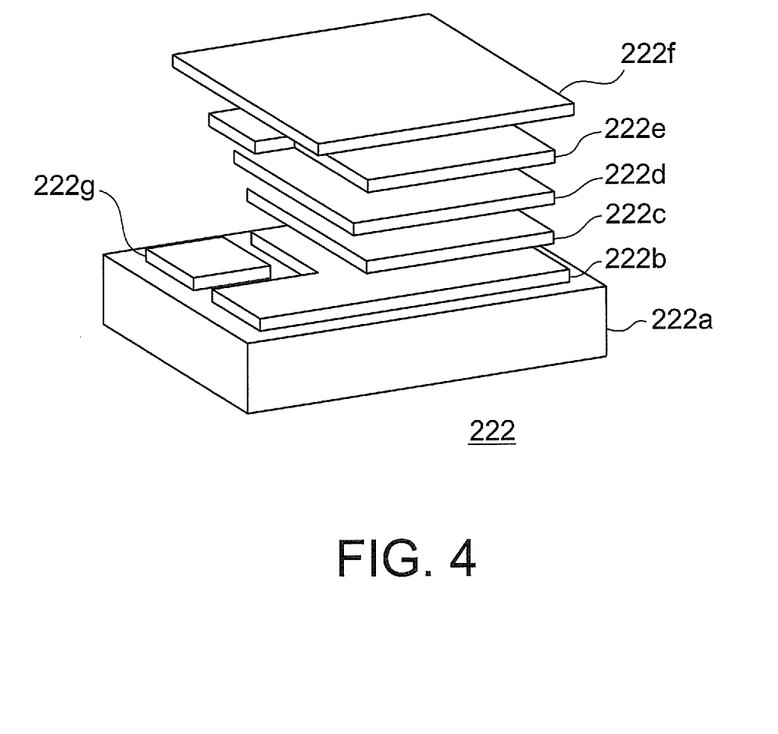
FIG. 4 is a perspective view showing a structure of the thin film battery 222.

The charge keeping module 22 may have a thin film battery 222 that can be charged by the transmitted power in addition to the capacitor 221. FIG. 4 is a perspective view showing a structure of the thin film battery 222. The thin film battery 222 includes a substrate 222a, a positive current collector 222b, a positive electrode 222c, a solid electrolyte 222d, a negative electrode 222e, a protective film 222f, and a negative current collector 222g. Since the solid electrolyte 222d is used, the thin film battery 222 has a safety even though being thin. The thin film battery 222 is a thin and light battery, which has, for example, a capacity of 1 to 10 mA/h, a thickness of 100 to 300 μm in one square inch, and a weight of 0.1 to 0.2 g. By providing such a thin and light battery in the power receiver 2, it is possible to operate the power receiver 2 more stably.

Returning to FIG. 3, the charge monitor 23 monitors a state of the power reception controller 21, in particular, the amount of charge accumulated in the charge keeping module 22. The monitoring manner is not limited. For example, since the voltage outputted from the capacitor 221 varies according to the amount of charge, it is possible to monitor the amount of charge through the voltage outputted from the capacitor 221. Also it is possible to monitor the amount of current flowing into the charge keeping module 22 or a time variation of the amount of current. The charge monitor 23 detects a power transmission state based on the amount of accumulated charge and the like and notifies the controller 24 of the power transmission state.

Figure 5A:
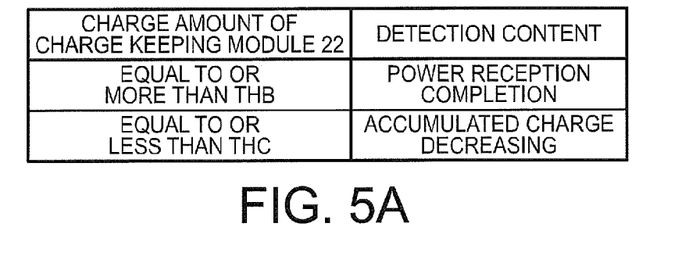
FIGS. 5A and 5B are diagrams showing an example of information detected by the charge monitor 23.
Figure 5B:
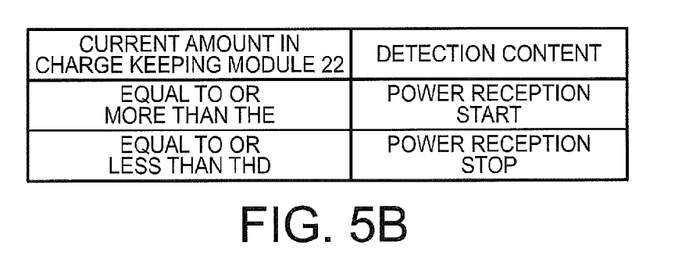

FIGS. 5A and 5B are diagrams showing an example of information detected by the charge monitor 23. For example, when the amount of current flowing in the charge keeping module 22 becomes equal to or more than a threshold value THA, the charge monitor 23 detects that the power reception from the power transmitter 1 is started. When the amount of charge accumulated in the charge keeping module 22 becomes equal to or more than a threshold value THB, the charge monitor 23 detects that the power reception from the power transmitter 1 is completed. On the other hand, when the amount of charge accumulated in the charge keeping module 22 becomes equal to or less than a threshold value THC (<THB), the charge monitor 23 detects that the amount of kept charge is reduced. Further, when the amount of current flowing in the charge keeping module 22 becomes equal to or less than a threshold value THD, the charge monitor 23 detects that the power reception is stopped.

The controller 24 controls the wireless communication module 25 and the memory 26 on the basis of the notification from the charge monitor 23. More specifically, the controller 24 controls timing at which the wireless communication module 25 performs wireless communication and timing at which a power reception module 20 performs wireless power reception and performs access to the memory 26. In addition, the wireless communication module 25 may have a buffer to temporarily store data.

The memory 26 includes a non-volatile memory cell 261 such as a NAND type flash memory or an MRAM (Magnetic Random Access Memory), and a memory interface (MEM IF) 262. Data is read from and/or written to the non-volatile memory cell 261 by the controller 24 through the memory interface 262.

It is assumed that the power receiver 2 of the present embodiment operates using the power wirelessly transmitted from the power transmitter 1, so that a non-volatile memory is used. If power is supplied from a battery or the like in the power receiver 2, a volatile memory such as a SRAM (Static Random Access Memory) or a DRAM (Dynamic Random Access Memory) may be used.

In this way, the power transmission and the data communication are performed wirelessly, and thus, the power transmitter 1 can access the memory 26 of the power receiver 2 without contact. Therefore, electrical terminals are not required for the power receiver 2, thereby, improving the degree of freedom in design and the waterproof property.

Next, a processing operation of the power transmission and reception system in FIG. 1 will be described. In the first embodiment, a basic processing operation of the power transmission and reception system will be described.

Figure 6:
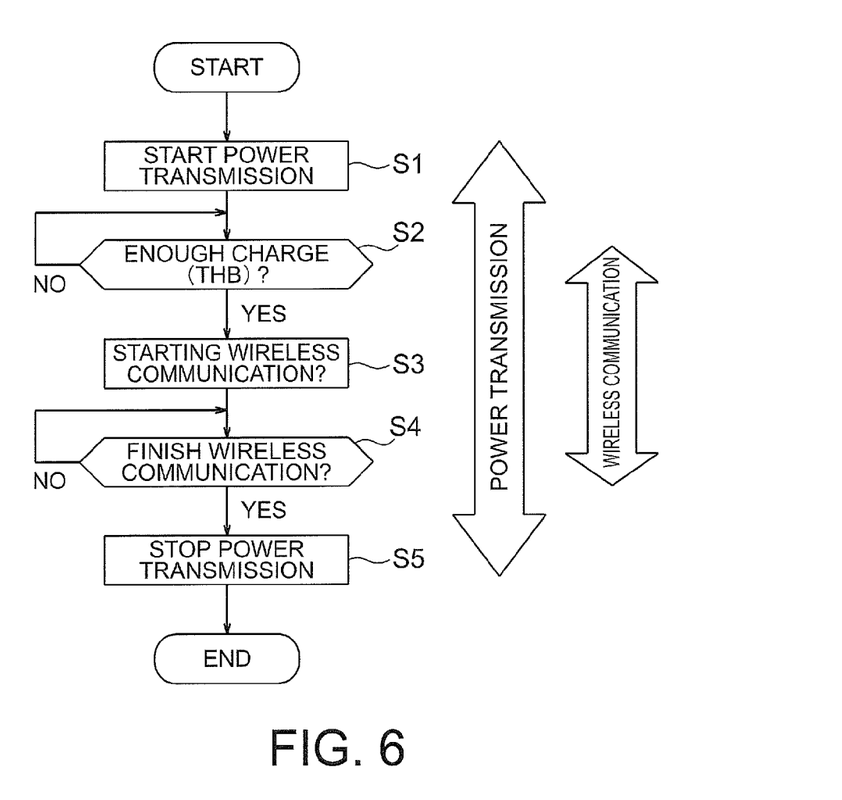
FIG. 6 is a flowchart showing an outline of the processing operation of the power transmission and reception system in FIG. 1.

FIG. 6 is a flowchart showing an outline of the processing operation of the power transmission and reception system in FIG. 1. First, the power transmission module 10 of the power transmitter 1 starts wireless power transmission to the power reception module 20 of the power receiver 2. Accordingly, the power reception module 20 receives power and charge is accumulated in the charge keeping module 22 (step S1). When the amount of charge (THB described above) necessary to perform wireless communication between the power transmitter 1 and the power receiver 2 is accumulated in the charge keeping module 22 (YES in step S2), the controller 24 starts wireless communication of data frame between the wireless communication module 12 of the power transmitter 1 and the wireless communication module 25 of the power receiver 2 (step S3). While performing the wireless communication, the controller 24 accesses the memory 26 as needed. When the wireless communication is finished (YES in step S4), the controller 24 stops the power transmission, and the processing operation of the power transmission and reception system is ended.

In this way, the wireless communication is performed while the amount of charge necessary to perform the wireless communication is accumulated in the charge keeping module 22 of the power receiver 2 and the power is being transmitted. Thereby, it is possible to perform communication in a stable state.

Figure 7:
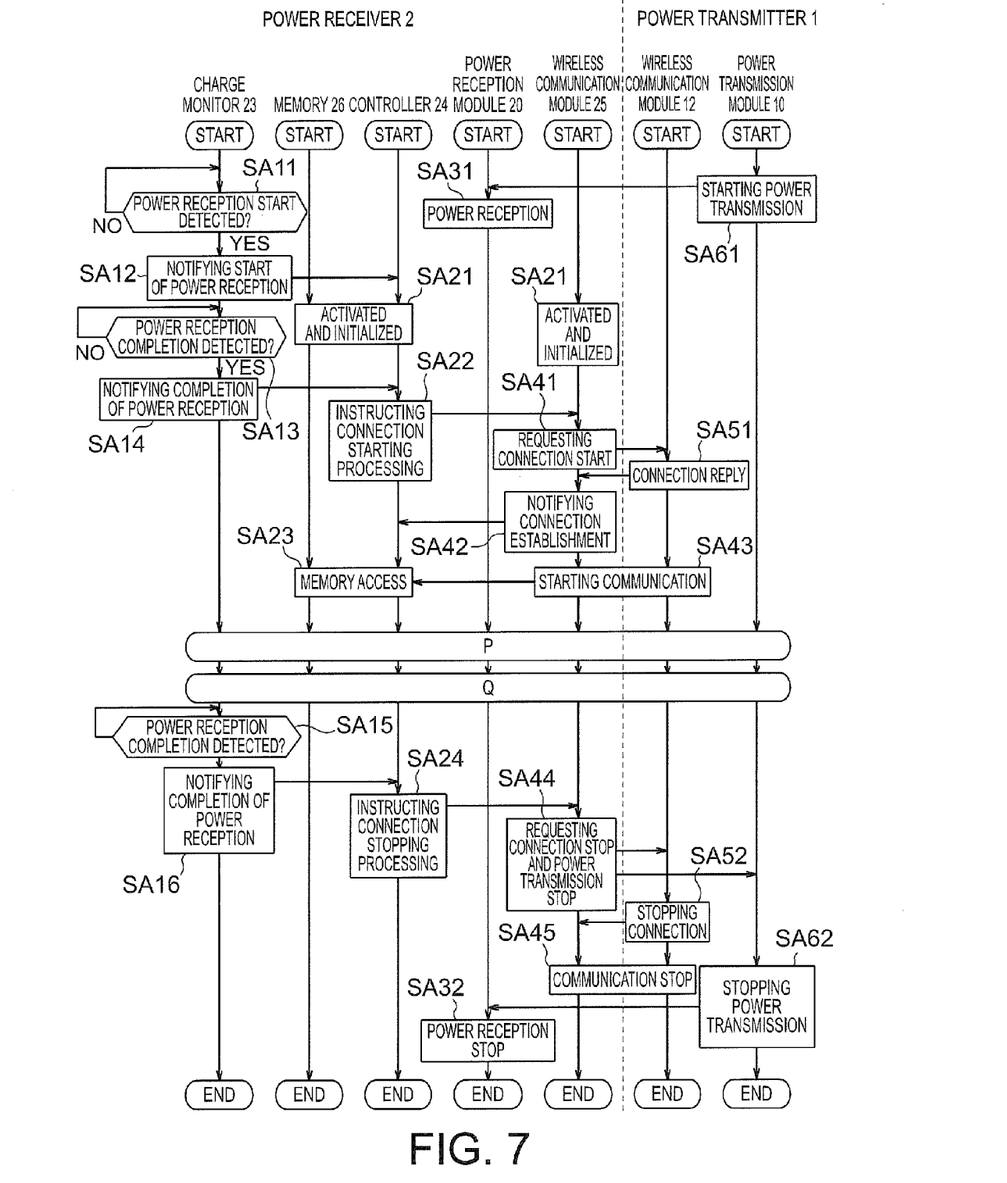
FIG. 7 is a sequence diagram showing FIG. 6 in more detail.

FIG. 7 is a sequence diagram showing FIG. 6 in more detail. The processing operation of the power transmission and reception system will be described in detail with reference to FIG. 7. Note that, the symbols P and Q in FIG. 7 will be used in the later description and are not related to the present embodiment.

First, the power transmission module 10 of the power transmitter 1 starts power transmission (step SA61). For example, if the power transmitter 1 is a mobile terminal device driven by a battery, it is possible to configure so that the power transmitter 1 explicitly notifies the power receiver 2 of the start of the power transmission. Or, when the power transmitter 1 is a stationary terminal device to which power is supplied from an electric outlet, it is possible to configure so that the power transmission state is constantly or periodically maintained. In the present embodiment, one of the configurations described as an example or another configuration may be used.

By the power transmission from the power transmitter 1, the power reception module 20 of the power receiver 2 starts power reception (step SA31). More specifically, the coil 21a of the power receiver 2 approaches the coil 11a of the power transmitter 1, so that the power reception controller 21 becomes in a power reception state and starts generating current. Accordingly, charge is accumulated in the charge keeping module 22.

The charge monitor 23 monitors the amount of charge accumulated in the charge keeping module 22 or the amount of current flowing into the charge keeping module 22. For example, when the amount of current exceeds the threshold value THA and thereby the charge monitor 23 detects the start of the power reception (YES in step SA11), the charge monitor 23 notifies the controller 24 that the power reception is started (step SA12). Accordingly, the controller 24 activates the controller 24 itself, the wireless communication module 25, and the memory 26 and performs power-on initialization control, which is called "power-on reset" (step SA21). The initialization control includes, for example, resetting various registers, loading data from the memory 26, and booting an operating system on a processor. By performing the initialization control in advance, preparation of communication can be done in an early stage.

Further, for example, when the amount of charge accumulated in the charge keeping module 22 exceeds the threshold value THB and thereby the charge monitor 23 detects the completion of the power reception (YES in step SA13), the charge monitor 23 notifies the controller 24 that the power reception is completed (step SA14). The completion of the power reception means that it is possible to start wireless communication. Here, the threshold value THB corresponds to a sufficient amount of charge for the wireless communication module 25 to perform wireless communication. More specifically, the amount of charge when the following formula (1) is satisfied is defined as the threshold value THB.

$$P*T = p*t + Em \quad (1)$$

Here, P is effective transmission power which is wirelessly transmitted, T is wireless transmission time of power, p is effective power consumption when wireless communication is performed, t is wireless communication time, and Em is energy required to access the memory 26.

The threshold value THB may be adjusted according to a state of the electric wave of the wireless communication. For example, when the state of the electric wave is bad, it is desired that the threshold value THB is set to high. Thereby, even if re-transmission due to data error occurs often when the wireless communication is performed, it is possible to prevent the charge from being insufficient.

Also, the threshold value THB may be adjusted according to the amount of current flowing from the power reception controller 21 to the charge keeping module 22 or a temporal variation (differential value) of the amount of current. For example, when the amount of current is small, the power supply is small, so that it is desired that the threshold value THB is set to high. Also, when the time variation of the amount of current is large, it is highly possible that the power supply is unstable, so that it is desired that the threshold value THB is set to high. In each case, it is possible to access the memory more stably by starting communication after accumulating a certain amount of charge.

When the controller 24 of the power receiver 2 is notified of the completion of the power reception, the controller 24 instructs the wireless communication module 25 to perform connection starting processing (step SA22). In response to this, the wireless communication module 25 transmits a connection start request signal to the power transmitter 1 (step SA41). The wireless communication module 12 of the power transmitter 1 recognizes that the power receiver 2 is ready to perform wireless communication and transmits a connection reply signal to the power receiver 2 (step SA51). When the wireless communication module 25 of the power receiver 2 receives the connection reply signal, the wireless communication module 25 notifies the controller 24 that the connection with the power receiver 2 is established (step SA42).

Although not shown in the drawings, after the connection establishment is notified, it is possible to perform authentication processing, exchange of terminal information, checking of capability (what functions are included), processing necessary for encrypting data to conceal data communication, and the like between the power transmitter 1 and the power receiver 2.

When the connection is established in this way, wireless communication is started between the wireless communication module 12 of the power transmitter 1 and the wireless communication module 25 of the power receiver 2 (step SA43). While performing the wireless communication, the controller 24 accesses the memory 26 (step SA23).

As the wireless communication, an example will be described in which data is read from the memory 26 of the power receiver 2 according to a request from the power transmitter 1 and the data is transferred to the power transmitter 1.

First, the wireless communication module 12 of the power transmitter 1 transmits a data read request to the power receiver 2. In the data read request, for example, a read address of the memory 26 may be specified or a set of a read start address and a data length may be specified. Also, a plurality of the sets may be specified. When data is read as a file, a path of the folder and a file name may be specified.

The wireless communication module 25 of the power receiver 2 which receives the data read request notifies the controller 24 of the data read request. The controller 24 reads data from the memory 26 according to the data read request. The read data is transmitted from the wireless communication module 25 to the power receiver 2 as a data frame. Data may be read and transmitted a plurality of times in response to one data read request.

Or, as wireless communication, in response to a request from the power transmitter 1, data is transmitted from the power transmitter 1 to the power receiver 2 and the data may be written to the memory 26 in the power receiver 2.

When the wireless communication is completed, the controller 24 instructs the wireless communication module 25 to perform connection stopping processing (step SA24). In response to this, the wireless communication module 25 transmits a connection stop request signal and a power transmission stop request signal to the power transmitter 1 (step SA44). When the wireless communication module 12 of the power transmitter 1 receives the connection stop request signal, the wireless communication module 12 stops the connection and transmits a connection stop signal to the power receiver 2 (step SA52). Thereby, the wireless communication between the power transmitter 1 and the power receiver 2 stops (step SA45). On the other hand, when the power transmission module 10 of the power transmitter 1 receives the power transmission stop request signal, the power transmission module 10 stops the power transmission (step SA62). Thereby, the power reception by the power reception module 20 of the power receiver 2 also stops (step SA32).

Note that, when performing the wireless communication or accessing the memory 26, the charge accumulated in the charge keeping module 22 is used. When the power consumed by the wireless communication and the memory access is greater than the power received by the power receiver 2 from the power transmitter 1, the amount of charge after steps SA23 and SA43 may be largely reduced. In this case, the controller 24 may issue a connection stopping processing instruction after the completion of the power reception is detected again (YES in step SA15, SA16).

Figure 8:
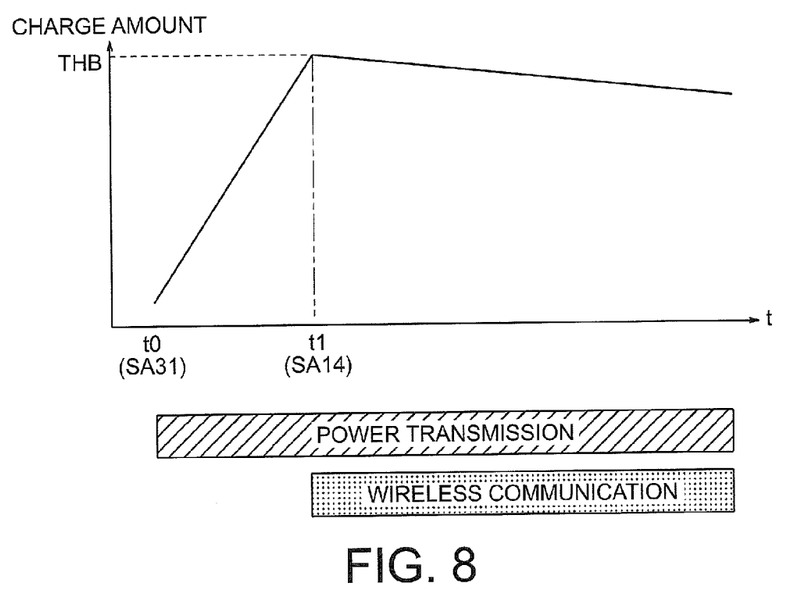
FIG. 8 is a diagram schematically showing a relationship between the amount of charge accumulated in the charge keeping module 22 and a processing operation of the power transmission and reception system.

FIG. 8 is a diagram schematically showing a relationship between the amount of charge accumulated in the charge keeping module 22 and a processing operation of the power transmission and reception system. In the graph of FIG. 8, the horizontal axis represents time and the vertical axis represents the amount of charge. When the power reception is started at time t0, the amount of charge gradually increases (step SA31 in FIG. 7). When the power reception is completed at time t1 (step SA14 in FIG. 7), the wireless communication is started.

As described above, in the first embodiment, the data frame is transmitted by the wireless communication means which is different from the power transmission means. Therefore, the data frame can be transmitted at high speed between the power transmitter 1 and the power receiver 2. Further, the wireless communication is performed while sufficient power is accumulated in the power receiver 2 and the power is being transmitted. Therefore, even the power receiver 2 having no power supply (or having only the small thin film battery 222) can perform the wireless communication stably.

Second Embodiment

In the first embodiment, it is in mind that the wireless communication is performed while the power transmission is being performed. However, the power transmission efficiency may be degraded depending on the positions of the coils 11*a* and 21*a*. In this case, the power consumed in the power receiver 2 can be greater than the power transmitted from the power transmitter 1 to the power receiver 2. As a result, the amount of charge accumulated in the charge keeping module 22 is reduced, and thus, it may be difficult to continuously perform the wireless communication and the memory access normally.

In the second embodiment described below, a power transmission and reception system that can cope with such a situation will be described.

Figure 9:
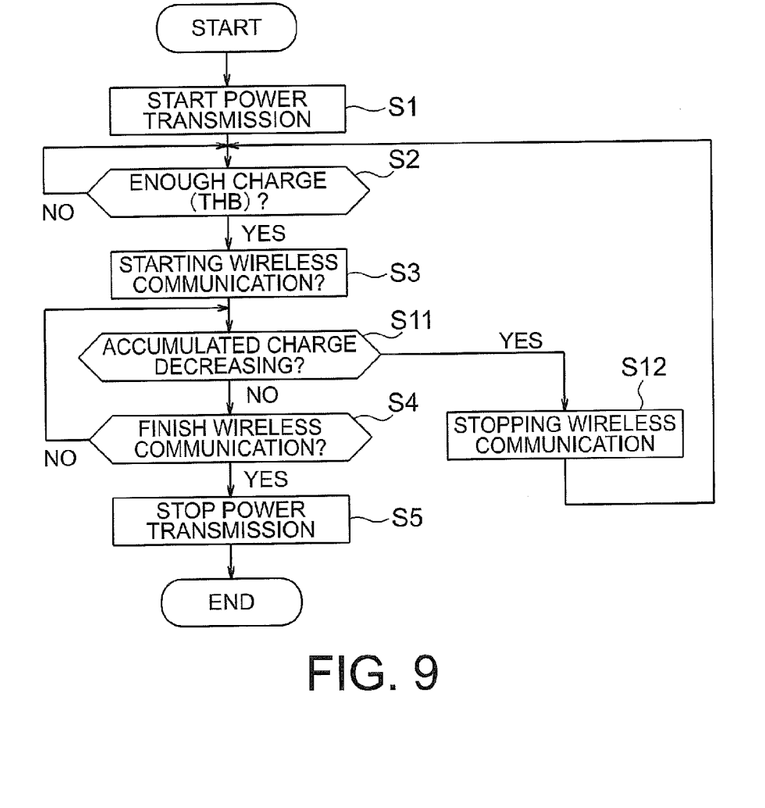
FIG. 9 is a flowchart showing an outline of a processing operation of the power transmission and reception system.

FIG. 9 is a flowchart showing an outline of a processing operation of the power transmission and reception system. The same steps as those in FIG. 6 are denoted by the same reference numerals as those in FIG. 6 and the description thereof will be omitted.

When the accumulated charge decreases during the wireless communication (step S11), the controller 24 of the power receiver 2 causes the wireless communication module 25 to stop the wireless communication (step S12). When a sufficient amount of charge is accumulated again in the charge keeping module 22 (YES in step S2), the controller 24 restarts the wireless communication (step S3).

Figure 10:
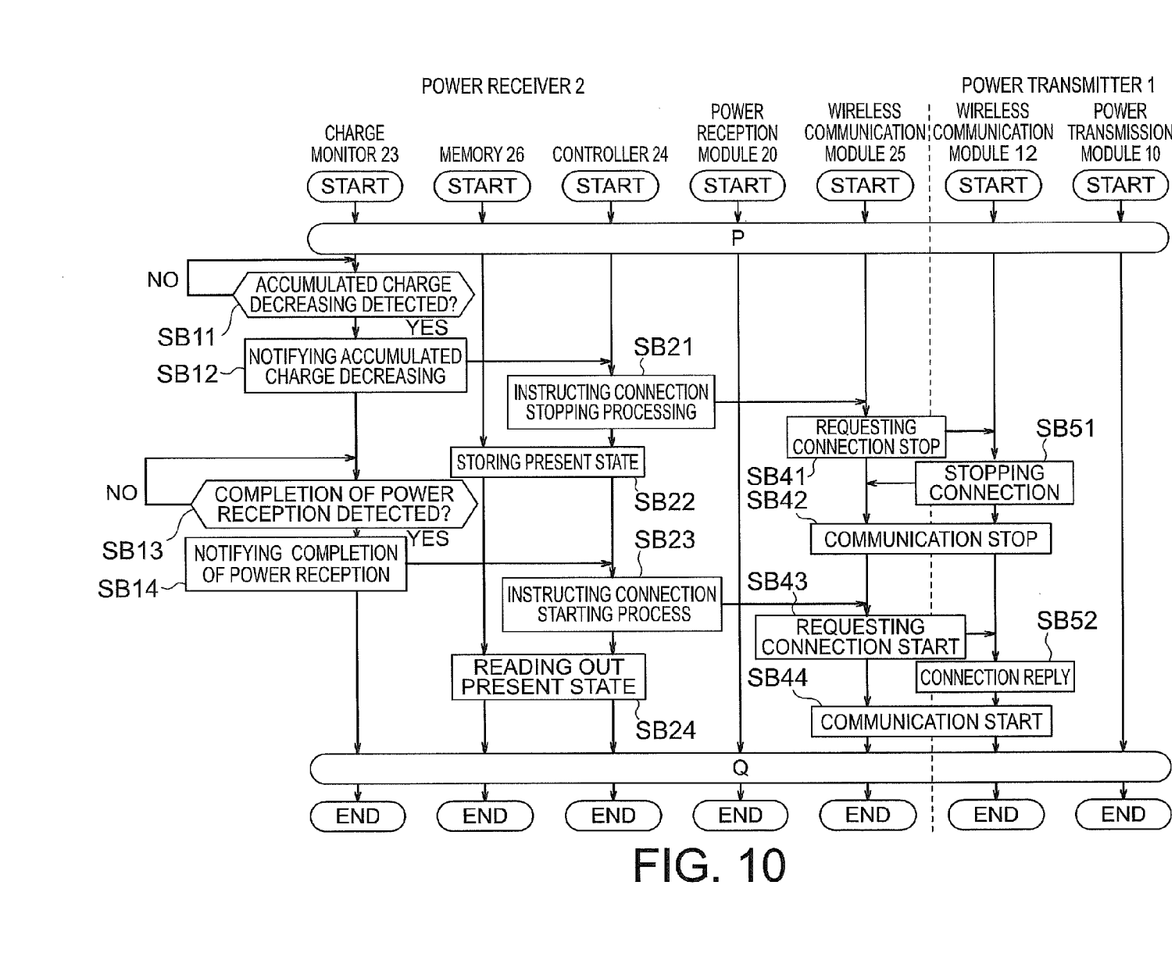
FIG. 10 is a sequence diagram showing FIG. 9 in more detail.

FIG. 10 is a sequence diagram showing FIG. 9 in more detail. FIG. 10 corresponds to steps S11 and S12 in FIG. 9. The processing operation of the power transmission and reception system will be described in detail with reference to FIG. 10. Each process in FIG. 10 is performed between "P" and "Q" in FIG. 7. The other processes are the same as those in FIG. 7, so that these processes are not shown in FIG. 10.

During the wireless communication, when the amount of charge accumulated in the charge keeping module 22 becomes equal to or less than the threshold value THC, the charge monitor 23 detects that the amount of accumulated charge is reduced (step SB11). Here, the threshold value THC corresponds to the amount of charge necessary to perform the processes of steps SB21 and SB41 described below (and SB22 if necessary).

The threshold value THC may be adjusted according to a state of the electric wave of the wireless communication. For example, when the state of the electric wave is bad, it is desired that the threshold value THC is set to high. Thereby, even if re-transmission due to data error often occurs when the wireless communication is performed, it is possible to prevent the charge from being insufficient.

The charge monitor 23 notifies the controller 24 that the amount of the accumulated charge has decreased (step SB12). The controller 24 instructs the wireless communication module 25 to perform the connection stopping processing (step SB21). In response to this, the wireless communication module 25 transmits the connection stop request signal to the power transmitter 1 (step SB41). When the wireless communication module 12 of the power transmitter 1 receives the connection stop request signal, the wireless communication module 12 stops the connection and transmits a connection stop signal to the power receiver 2 (step SB51). Thereby, the wireless communication between the power transmitter 1 and the power receiver 2 and the memory access by the controller 24 temporarily stop (step SB42).

In parallel with the connection stopping processing, the controller 24 may store the present state in the memory 26 (step SB22). The present state includes authentication information of the power transmitter 1 that is communicating with the power receiver 2, information indicating to what extent the request from the power transmitter 1 is performed (for example, how much data is transmitted with respect to a requested data size) and so on.

Even after the wireless communication is stopped, the power transmission is performed. Therefore, in the power receiver 2, if the controller 24 and the wireless communication module 25 do not operate, charge is accumulated in the charge keeping module 22. When the completion of the power reception is detected again by the charge monitor 23 (YES in step SB13), the wireless communication is restarted (steps SB14, SB23, SB43, SB52, and SB44).

When the present state is stored in the memory 26, the controller 24 may read the present state (step SB24). It is possible to confirm that the power transmitter 1 of the destination of the restarted communication is the same as the power transmitter 1 which previously communicated with the power receiver 2 on the basis of the authentication information of the read present state. Also it is possible to prevent data from being transmitted twice or more by performing successive data frame communication on the basis of the information indicating how much of the request from the power transmitter 1 is performed.

Figure 11:
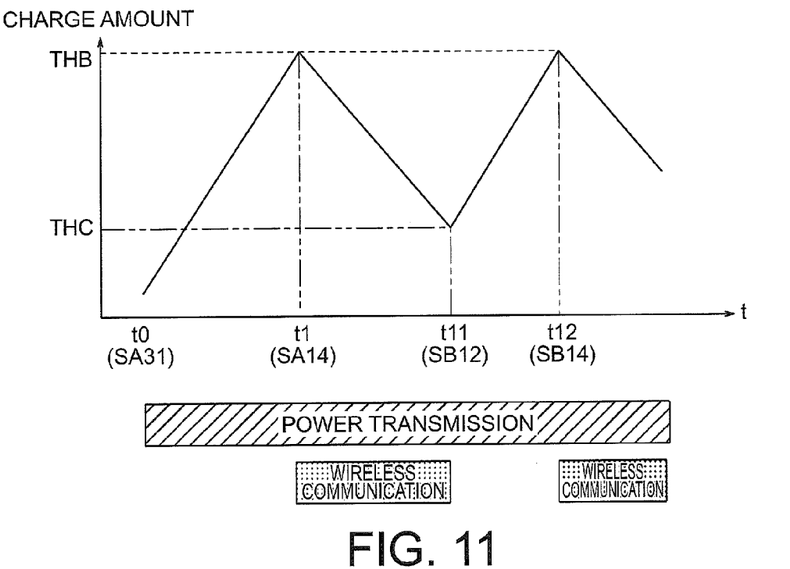
FIG. 11 is a diagram schematically showing a relationship between the amount of charge accumulated in the charge keeping module 22 and a processing operation of the power transmission and reception system.

FIG. 11 is a diagram schematically showing a relationship between the amount of charge accumulated in the charge keeping module 22 and a processing operation of the power transmission and reception system. In the graph of FIG. 11, the horizontal axis represents time and the vertical axis represents the amount of charge. When the power reception is started at time t0, the amount of charge gradually increases (step SA31 in FIG. 7). When the power reception is completed at time t1 (step SA14 in FIG. 7), the wireless communication is started.

Thereafter, when the amount of charge accumulated in the charge keeping module 22 becomes equal to or less than the threshold value THC at time t11 (step SB12 in FIG. 10), the wireless communication stops. When a sufficient amount of charge is accumulated again at time t12 (step SB14 in FIG. 10), the wireless communication restarts.

In this way, in the second embodiment, when the amount of accumulated charge decreases, the wireless communication and the memory access temporarily stop. Therefore, even when the power consumed by the wireless communication and the memory access is greater than the power transmitted from the power transmitter 1 to the power receiver 2, it is possible to perform the wireless communication stably.

Third Embodiment

In the second embodiment described above, the wireless communication is stopped by detecting the decrease of the amount of the accumulated charge, the power transmission is continued, and the wireless communication is restarted after the charge is accumulated. However, the power transmission may be stopped during the wireless communication. For example, the power transmission is stopped when the power transmitter 1 stops the power transmission or the coil 21a is away from the coil 11a. When the power transmission is stopped, the power transmission is not necessarily restarted. In this case, the charge is continuously consumed and reduced until the decrease of the amount of the accumulated charge is detected.

In the third embodiment described below, a power transmission and reception system that can cope with such a situation will be described.

Figure 12:
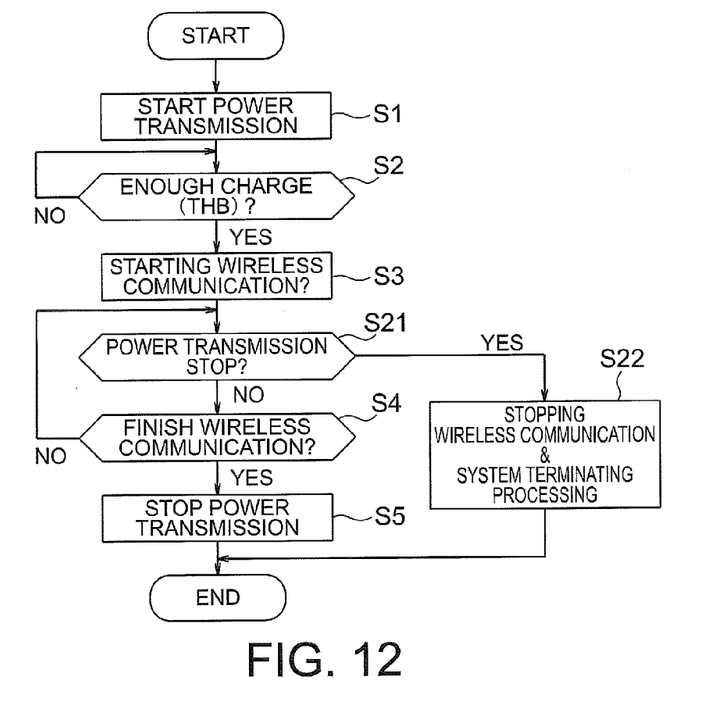
FIG. 12 is a flowchart showing an outline of a processing operation of the power transmission and reception system.

FIG. 12 is a flowchart showing an outline of a processing operation of the power transmission and reception system. The same steps as those in FIG. 9 are denoted by the same reference numerals as those in FIG. 9 and the description thereof will be omitted. When the accumulated charge decreases during the wireless communication (step S21), the controller 24 of the power receiver 2 causes the wireless communication module 25 to stop the wireless communication and performs processing for terminating the operation of the power transmission and reception system (step S22). Then, the controller 24 terminates the processing.

Figure 13:
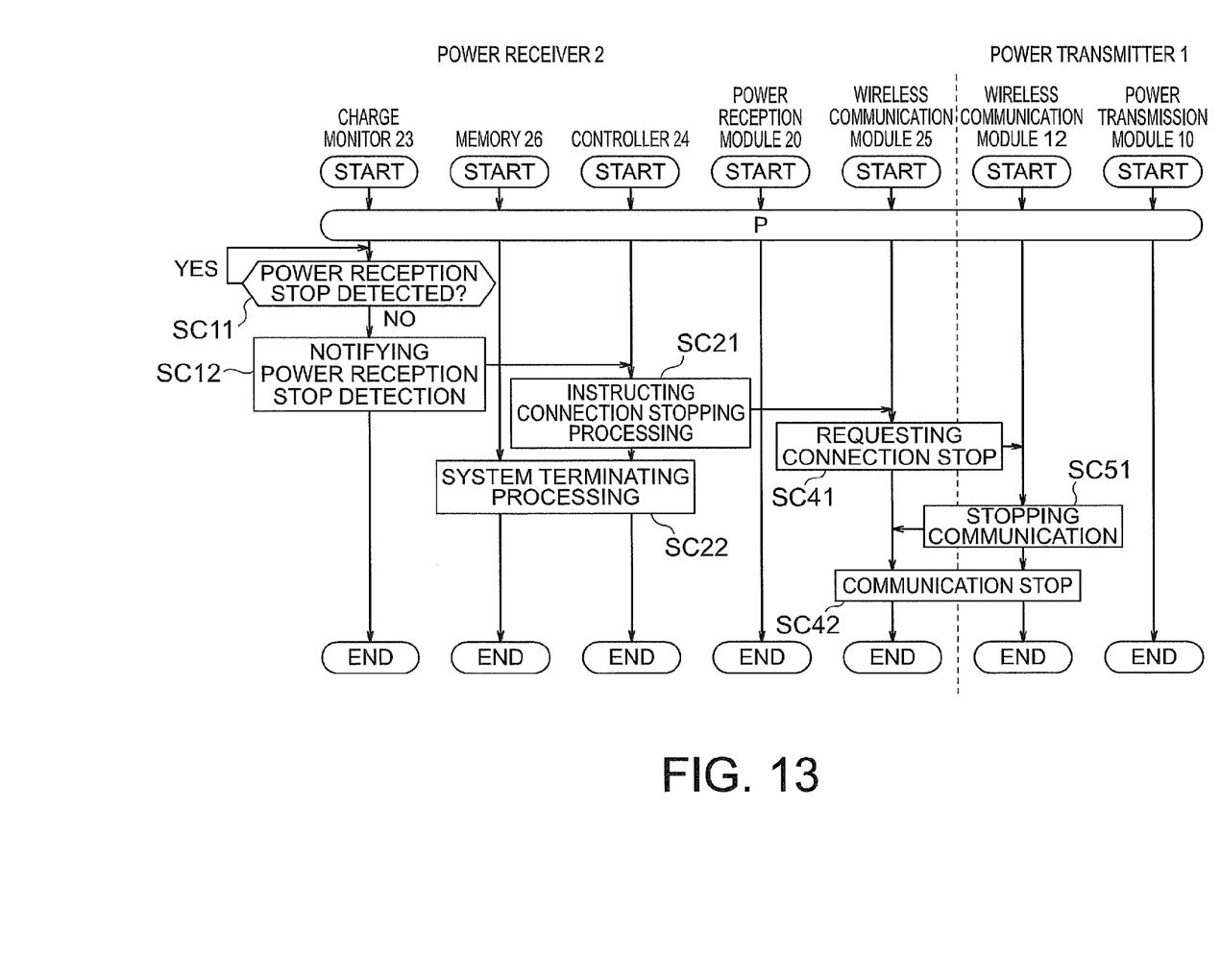
FIG. 13 is a sequence diagram showing FIG. 12 in more detail.

FIG. 13 is a sequence diagram showing FIG. 12 in more detail. FIG. 13 corresponds to steps S21 and S22 in FIG. 12. The processing operation of the power transmission and reception system will be described in detail with reference to FIG. 13. Each process in FIG. 10 is performed after "P" in FIG. 7. The processes before "P" are the same as those in FIG. 7, so that these processes are not shown in FIG. 10.

When the amount of current flowing into the charge keeping module 22 becomes equal to or less than the threshold value THD, the charge monitor 23 detects that the power reception is stopped (YES in step SC11). Here, the threshold value THD corresponds to the amount of current necessary to perform the processes of steps SC21, SC41, and SC22 described below.

The charge monitor 23 may detect that the power reception is stopped by considering the amount of current flowing into the charge keeping module 22 as well as a time variation (differential value) of the amount of current. That is, when the amount of current becomes equal to or less than the threshold value THD, the charge monitor 23 detects that the power reception is stopped. Further, when the time variation of the amount of current falls below a predetermined threshold value and becomes a steady state, the charge monitor 23 can detect that the power reception is not stopped temporarily but stopped completely.

The charge monitor 23 notifies the controller 24 that the stop of the power reception is detected (step SC12). The controller 24 instructs the wireless communication module 25 to perform the connection stopping processing (step SC21). Thereby, the wireless communication is stopped (steps SC41, SC51, and SC42).

Further, the controller 24 performs system terminating processing (step SC22). More specifically, the controller 24 performs stopping processing of the operating system and saves various register values into the memory 26 and so on. Thereby, the operation of the power transmission and reception system is finished.

Figure 14:
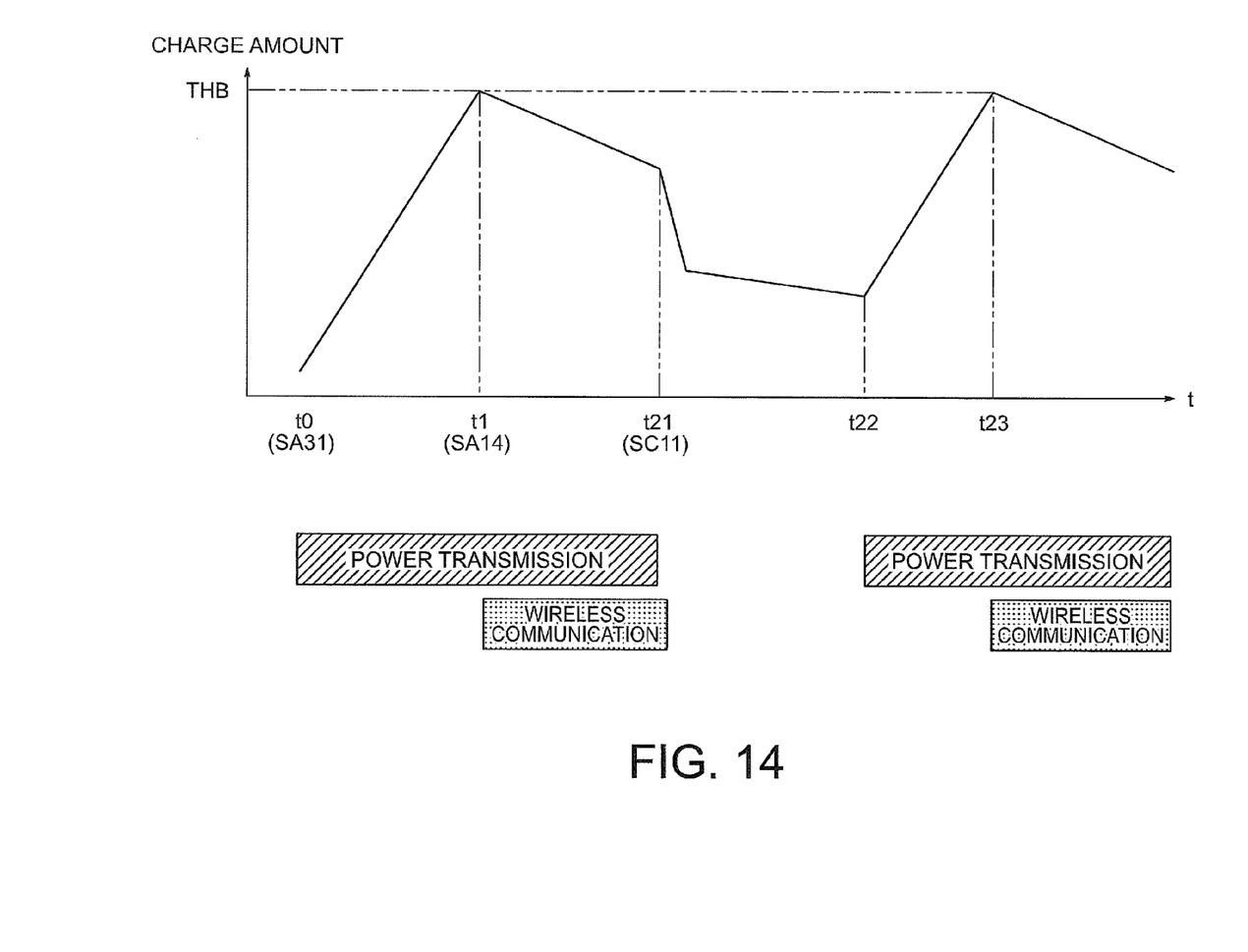
FIG. 14 is a diagram schematically showing a relationship between the amount of charge accumulated in the charge keeping module 22 and a processing operation of the power transmission and reception system.

FIG. 14 is a diagram schematically showing a relationship between the amount of charge accumulated in the charge keeping module 22 and a processing operation of the power transmission and reception system. In the graph of FIG. 14, the horizontal axis represents time and the vertical axis represents the amount of charge. When the power reception is started at time t0, the amount of charge gradually increases (step SA31 in FIG. 7). When the power reception is completed at time t1 (step SA14 in FIG. 7), the wireless communication is started. Thereafter, when the power transmission is stopped at time t21 (step SC12 in FIG. 13), the wireless communication is stopped and the system terminating processing is performed. Thereby, the reduction of the amount of charge is suppressed.

Thereafter, if the power transmission is restarted (time t22), the wireless communication is restarted at time t23 at which the charge is sufficiently accumulated again. The consumption of the charge is suppressed in a period of time between the time t21 and t22 in which the power transmission is stopped, so that it is possible to shorten a period of time from time t22 to t23 which is a waiting time until the wireless communication is restarted.

In this way, in the third embodiment, the wireless communication is stopped and the system terminating processing is performed immediately after the stop of the power reception is detected. Therefore, it is possible to prevent the charge from being wasted after the power transmission is stopped. Therefore, the charge is still accumulated in the power receiver 2, thereby, restarting the wireless communication quickly when the power transmission is restarted.

At least a part of the power transmission and reception system explained in the above embodiments can be formed of hardware or software. When the power transmission and reception system is partially formed of the software, it is possible to store a program implementing at least a partial function of the power transmission and reception system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the power transmission and reception system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power transmission and reception system comprising a power transmitter and a power receiver, wherein:
   (i) the power transmitter comprises:
      a power transmission module configured to wireless-transmit power to the power receiver; and
      a first wireless communication module configured to perform wireless communication with the power receiver;
   (ii) the power receiver comprises:
      a power reception module configured to receive the power transmitted from the power transmission module; and
      a second wireless communication module configured to perform wireless communication with the first wireless communication module using the received power;
   wherein the second wireless communication module is configured to perform wireless communication while the power reception module is receiving the power;
   wherein the power reception module comprises:
      a coil configured to receive an electric wave configured to transmit the power;
      a power reception controller configured to convert the electric wave to a current; and
      a charge keeping module configured to keep charges by the current;
   wherein the power receiver further comprises:
      a charge monitor configured to monitor an amount of charges kept in the charge keeping module; and
      a controller configured to start the wireless communication by the second wireless communication module when the amount of charges kept in the charge keeping module becomes over a first threshold after power reception is started; and
   wherein the controller is configured to stop the wireless communication by the second wireless communication module when the amount of charges kept in the charge keeping module becomes below a second threshold.

2. The system of claim 1, wherein the controller is configured to restart the wireless communication by the second wireless communication module when the amount of charges kept in the charge keeping module becomes above a third threshold after the wireless communication by the second wireless communication module has been stopped.

3. The system of claim 2, wherein the power receiver further comprises a memory; and
   wherein the controller is configured to:
      store, in the memory, authentication information of the power transmitter that has performed the wireless communication when the wireless communication by the second wireless communication module is stopped; and
      use the authentication information stored in the memory for authentication of the power transmitter to perform the wireless communication when the controller restarts the wireless communication by the second wireless communication module.

4. The system of claim 1, wherein the charge monitor is configured to monitor a current flowing into the charge keeping module, and
   wherein the controller is configured to stop the wireless communication by the second wireless communication module and perform a termination process of the power transmission and reception system when the current flowing into the charge keeping module becomes below a third threshold.

5. The system of claim 1, wherein the charge keeping module comprises a battery capable of storing the power received by the power reception module.

6. The system of claim 1, wherein a frequency of an electric wave that transmits the power is 13.56 MHz.

7. The system of claim 1, wherein a frequency of an electric wave that is used for the wireless communication is 2.4 GHz or 4.48 GHz.

8. A power receiver configured to perform wireless communication with a power transmitter, the power transmitter comprising a power transmission module configured to wireless-transmit power, and a first wireless communication module configured to perform wireless communication, the power receiver comprising:
   a power reception module configured to receive the power transmitted from the power transmission module; and
   a second wireless communication module configured to perform wireless communication with the first wireless communication module using the received power;
   wherein the second wireless communication module is configured to perform wireless communication while the power reception module is receiving the power;
   wherein the power reception module comprises:
      a coil configured to receive an electric wave configured to transmit the power;

a power reception controller configured to convert the electric wave to a current; and a charge keeping module configured to keep charges by the current;

wherein the power receiver comprises:

a charge monitor configured to monitor an amount of charges kept in the charge keeping module; and a controller configured to start the wireless communication by the second wireless communication module when the amount of charges kept in the charge keeping module becomes over a first threshold after power reception is started; and wherein the controller is configured to stop the wireless communication by the second wireless communication module when the amount of charges kept in the charge keeping module becomes below a second threshold.

9. The receiver of claim 8, wherein the controller is configured to restart the wireless communication by the second wireless communication module when the amount of charges kept in the charge keeping module becomes above a third threshold after the wireless communication by the second wireless communication module has been stopped.

10. The receiver of claim 9, further comprising:

a memory;

wherein the controller is configured to:

store, in the memory, authentication information of the power transmitter that has performed the wireless communication when the wireless communication by the second wireless communication module is stopped; and use the authentication information stored in the memory for authentication of the power transmitter to perform the wireless communication when the controller restarts the wireless communication by the second wireless communication module.

11. The receiver of claim 8, wherein the charge monitor is configured to monitor a current flowing into the charge keeping module, and wherein the controller is configured to stop the wireless communication by the second wireless communication module and perform a termination process of the power transmission and reception system when the current flowing into the charge keeping module becomes below a third threshold.

12. The receiver of claim 8, wherein the charge keeping module comprises a battery capable of storing the power received by the power reception module.

13. The receiver of claim 8, wherein a frequency of an electric wave that transmits the power is 13.56 MHz.

14. The receiver of claim 8, wherein a frequency of an electric wave that is used for the wireless communication is 2.4 GHz or 4.48 GHz.

* * * * *